United States Patent
Miyashita

(10) Patent No.: US 7,493,290 B2
(45) Date of Patent: Feb. 17, 2009

(54) METHOD AND SYSTEM FOR PRINTING IMAGE

(75) Inventor: Mamoru Miyashita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 1003 days.

(21) Appl. No.: 10/982,888

(22) Filed: Nov. 8, 2004

(65) Prior Publication Data
US 2005/0099652 A1 May 12, 2005

(30) Foreign Application Priority Data
Nov. 11, 2003 (JP) ............................. 2003-381564

(51) Int. Cl.
*G06F 3/12* (2006.01)
*G06F 15/00* (2006.01)
*H04L 29/02* (2006.01)

(52) U.S. Cl. ..................... 705/52; 455/3.01; 455/556.1; 455/557; 358/1.15

(58) Field of Classification Search ................... 705/52; 455/3.01; 358/1.15
See application file for complete search history.

(56) References Cited

U.S. PATENT DOCUMENTS

| | | | | |
|---|---|---|---|---|
| 5,873,030 A | * | 2/1999 | Mechling et al. | 455/408 |
| 6,812,962 B1 | * | 11/2004 | Fredlund et al. | 348/231.2 |
| 7,259,879 B2 | * | 8/2007 | Yoshino | 358/1.15 |
| 2002/0035546 A1 | * | 3/2002 | Aoki | 705/52 |
| 2002/0041394 A1 | * | 4/2002 | Aoki | 358/1.15 |
| 2002/0054345 A1 | * | 5/2002 | Tomida et al. | 358/1.15 |
| 2002/0181010 A1 | * | 12/2002 | Pineau | 358/1.15 |
| 2004/0070675 A1 | * | 4/2004 | Fredlund et al. | 348/208.1 |
| 2004/0095498 A1 | * | 5/2004 | Woodworth | 348/333.01 |
| 2005/0270571 A1 | * | 12/2005 | Fujitani et al. | 358/1.15 |

FOREIGN PATENT DOCUMENTS

JP  2001-309106 A  11/2001
JP  2002-132923 A  5/2002

* cited by examiner

Primary Examiner—Calvin L Hewitt, II
Assistant Examiner—Steven Kim
(74) Attorney, Agent, or Firm—Sughrue Mion, PLLC

(57) ABSTRACT

Image data stored in a memory of a portable communication apparatus is read by an adapter device in response to that the portable communication apparatus is connected to a connector of the adapter device. Subsequently, the portable communication apparatus starts communicating with a charging server and, simultaneously, a print image selection screen is displayed on a LCD. A user selects images and the number of prints of each image in the print image selection screen. Printing is executed when a print button is operated after the user finished selecting the images and the number of prints of each image. After printing is completed, the communication from the portable communication apparatus to the charging server is cut off. The charging server charges telecommunication charge to the portable communication apparatus based on the duration of communication with the charging server.

16 Claims, 4 Drawing Sheets

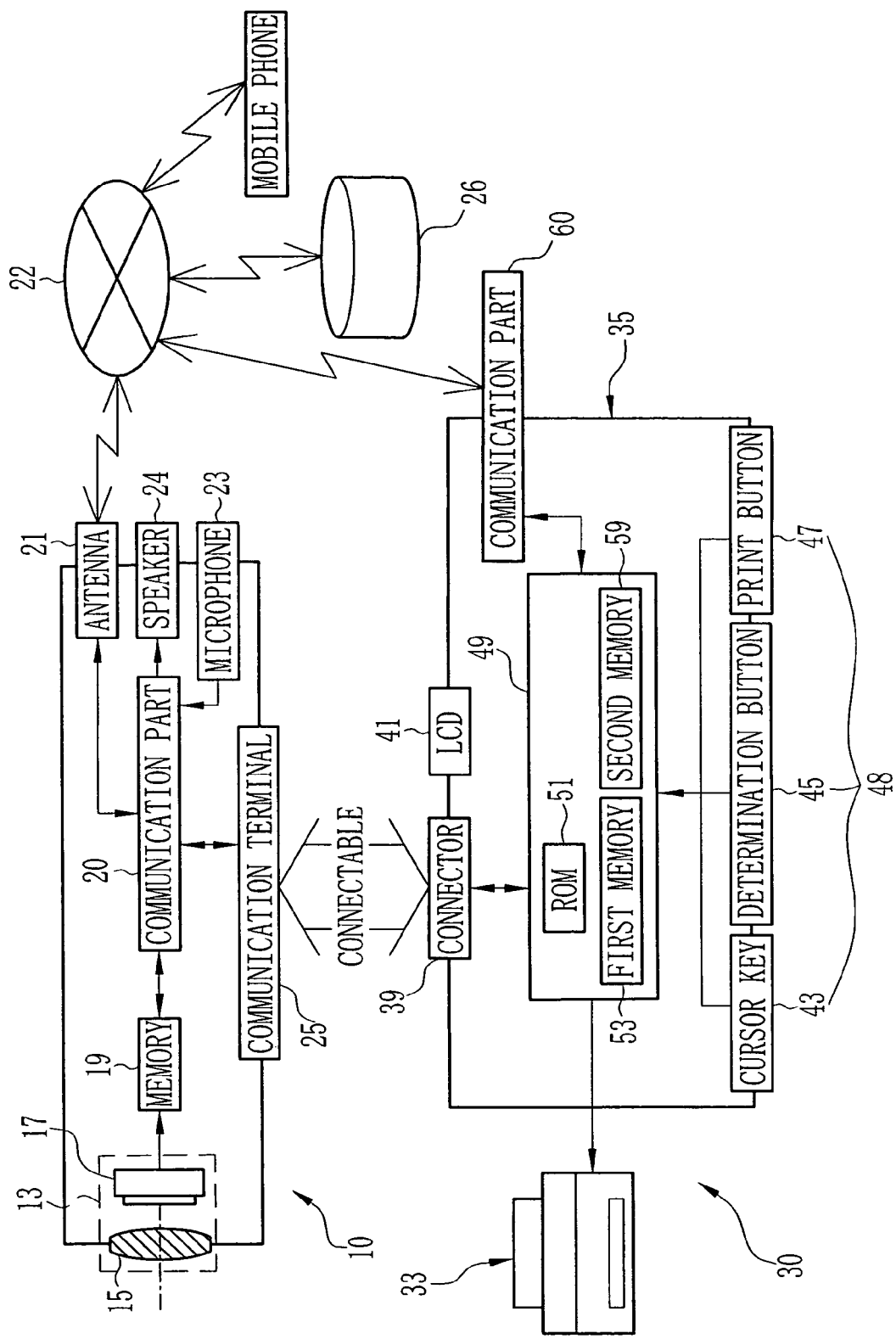

METHOD AND SYSTEM FOR PRINTING IMAGE

BACKGROUND OF THE INVENTION

1. Field of the Invention

The present invention relates to a method and a system for printing images photographed by a portable communication apparatus provided with an imaging device.

2. Background Arts

A mobile phone provided with a camera, having an imaging function as well as functions for voice communication and data communication such as sending and receiving e-mail, has been popular recently. Such mobile phone with the camera may store images photographed by the imaging device as image data. For example, Japanese Patent Laid-Open Publication Number 2002-132923 discloses a method for printing image data, stored in the mobile phone with the camera, by sending them to a printing device via telecommunication network and printing them by means of the printing device.

Concerning the speed and the cost for the communication, however, it is not preferable to send image data via telecommunication network. As an example of other methods, a print system disclosed in Japanese Patent Laid-Open Publication Number 2001-309106 prints images by using a print unit of stand-alone type. In order to print images in this print unit, a user directly sends image data stored in the mobile phone with the camera to a printer, incorporated in the print unit, via wire or infrared communication and operates the printer to print images.

Nevertheless, that print system has a problem of increasing the size and the cost of the print unit, since a charging system and a cash insertion equipment must be mounted within a print unit along with devices for receiving image data and for printing them. Furthermore, the user must prepare cash in advance, as the print system requires it to be inserted in every printing.

SUMMARY OF THE INVENTION

An object of the present invention is to provide a method and a system for printing images being convenient for a user, with reducing cost for a print unit.

In order to achieve the above object, an image print system of the present invention comprises a portable communication apparatus for communicating via telecommunication line by a communicating device and for storing images photographed by an imaging device as image data, a charging server connected to the portable communication apparatus via the telecommunication line for charging the portable communication apparatus for telecommunication charge based on the communicating duration or volume of communicated data, and a print unit for reading out the image data from the portable communication apparatus by connecting to the portable communication apparatus by means of a connecting device, printing images on recording paper based on the image data, and controlling the communicating device of the portable communication apparatus to communicate/cut off the communication with the charging server.

In order to achieve the above object, an image printing method of the present invention is as follows. A print server reads the image data, stored in the portable communication apparatus, into itself when the portable communication apparatus is connected to the print server. Then, the print server controls the portable communication apparatus to connect with charging server via telecommunication line and displays the images on a display according to the image data read into the print server. A user arbitrarily selects images for printing among the images displayed on the display and specifies the number of prints of each selected image. Subsequently, when the user operates a print command, the print server drives a printer in response to the print command to print the selected images as many as each specified number of prints. When printing is completed, the print server controls the portable communication apparatus to disconnect from the charging server. Based on connecting duration with the portable communication apparatus, the charging server charges the portable communication apparatus for telecommunication charge.

According to the method and the system for printing images of the present invention, since the printing charge is charged to the portable communication apparatus as telecommunication charge, there is no need for the print unit to collect cash as the printing charge from the user and for the user to prepare cash in advance for the printing. Thus, the print unit does not need either a charging system or a cash insertion equipment to be incorporated therein, and that enables the print unit to reduce its size and the cost.

Furthermore, the user tends to take time to select the images for printing carefully in the conventional method and system for printing, as the printing charge is based on the number of prints. However, since the method and the system for printing image of the present invention may charge the telecommunication charge based on the time for operation including selecting the images, the user tends to operate the print unit quickly for trying to save time in an attempt to be charged less, and it may speed up the rotation of customers and collect more of them efficiently.

BRIEF DESCRIPTION OF THE DRAWINGS

One with ordinary skill in the art would easily understand the above-described objects and advantages of the present invention when the following detailed description is read with reference to the drawings attached hereto.

FIG. 5 is a block diagram illustrating an image print system of another embodiment of the present invention.

PREFERRED EMBODIMENTS OF THE INVENTION

Figure 1:
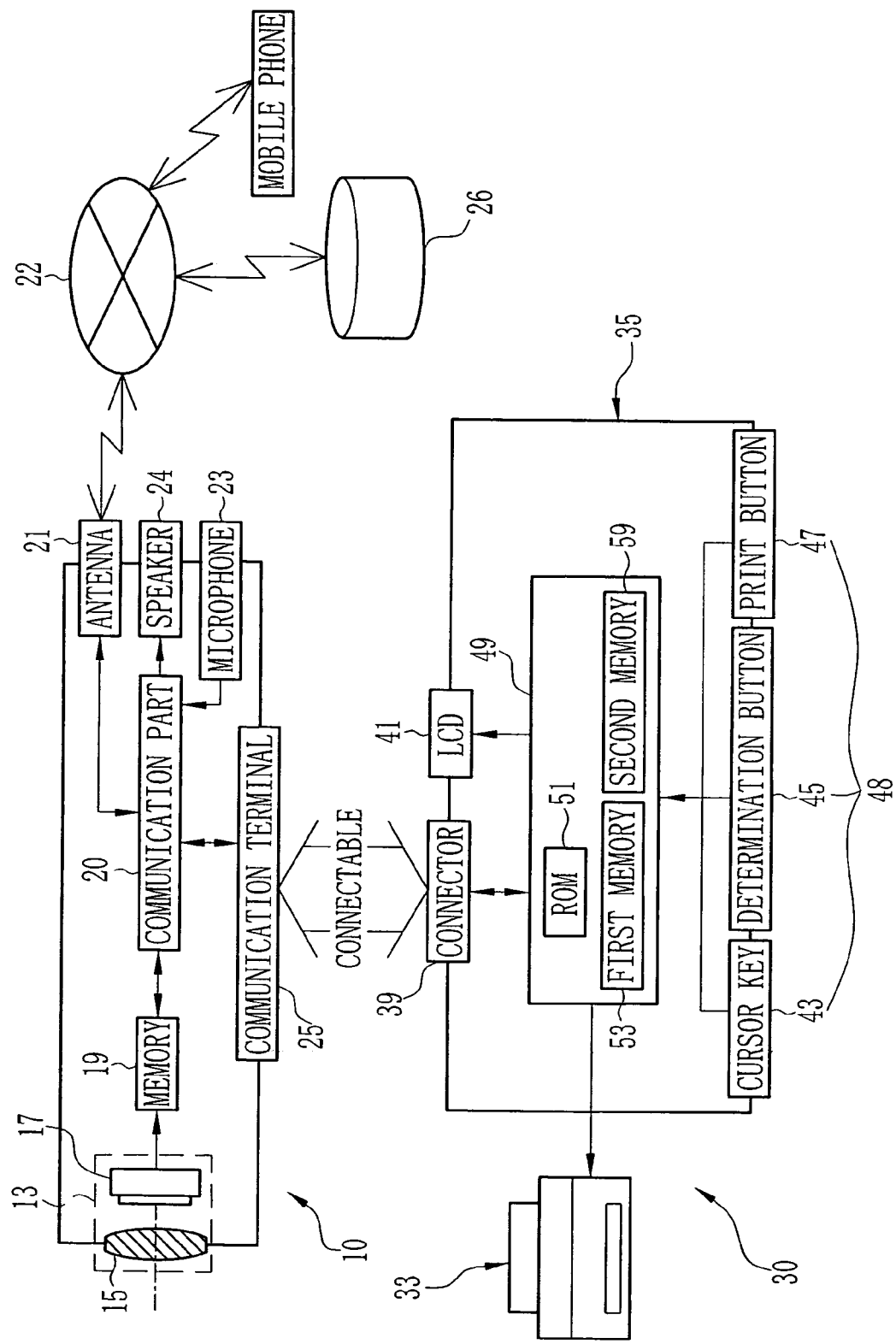
FIG. 1 is a block diagram illustrating an image print system of the present invention.

An image print system of the present invention shown in FIG. 1 is administrated by a mobile phone company, which operates a communication system for a mobile phone with a camera. A mobile phone with a camera (referred to as the mobile phone hereinafter) 10 is provided with an imaging part 13. When a taking button (not shown) is pushed, a subject image taken through a taking lens 15 is captured by a CCD 17 as image pickup signals. The image pickup signals are converted into image data and stored in a memory 19.

The mobile phone 10 is also provided with a communication part 20 for sending and receiving various data and is connected to a communication network 22 of a telecommunication line administrated by the mobile phone company, via an antenna 21. Via the communication network 22, the mobile phone 10 is connected to external devices such as another mobile phone 27 or a personal computer. The mobile phone 10 may communicate with the external devices by voice through a microphone 23 and a speaker 24 or by sending and receiving e-mail and the image data stored in the memory 19.

The mobile phone 10 is also provided with a communication terminal 25 connected to the communication part 20. The communication terminal 25 is exposed when a bottom lid of the mobile phone 10 is opened, for example. The communication terminal 25 may send the image data to external devices such as a personal computer and an adapter device 35 of a print unit 30, which is described later, by being connected to them.

The communication network 22 has a plurality of base stations for relaying data communication operated by the communication part 20 between the mobile phone 10 and other devices. The communication network 22 is also connected to a charging server 26 that calculates telecommunication charge based on the volume of communication of the mobile phone 10 such as duration of voice communication and volume of communicated data by e-mail with referring to a table, in which user IDs (phone number, for example) and their telecommunication charges are related each other. Since the charging server 26 is provided with a predetermined phone number, it is possible to communicate with the charging server 26 by calling the phone number.

The print unit 30 comprises a printer 33 and the adapter device 35, which is a print server, and both of them are connected to each other by a connecting line such as a USB cable or by wireless. Such print units 30 are placed at station kiosks, restaurants, convenience stores, game halls, and the like.

For example, an inkjet printer or a thermal printer is applied as the printer 33. The printer 33 is driven by the adapter device 35 and prints the images on recording paper based on the image data sent from the adapter device 35. The adapter device 35 is provided with a connecter 39 that is connectable with the communication terminal 25 of the mobile phone 10. The image data may be read out from the mobile phone 10 and sent to the printer 33 when the communication terminal 25 is connected with the connector 39.

The adapter device 35 is also provided with a liquid crystal display (LCD) 41 and an operating section 48, which is connected to the controlling section 49 and comprises a cursor key 43, a determination button 45, and a print button 47. The controlling section 49 controls the adapter device 35, the printer 33, and the mobile phone 10 based on a control program stored in a ROM 51. When the controlling section 49 detects that the mobile phone 10 is connected with the connector 39, it controls the mobile phone 10.

When the mobile phone 10 is connected to the connector 39, the controlling section 49 reads the image data, stored in the memory 19 of the mobile phone 10, and stores them in a first memory 53 within the controlling section 49 of the adapter device 35. Subsequently, the controlling section 49 drives the communication part 20 of the mobile phone 10 to start communicate with the charging server 26 and the LCD 41 to display a print image selection screen.

Figure 2:
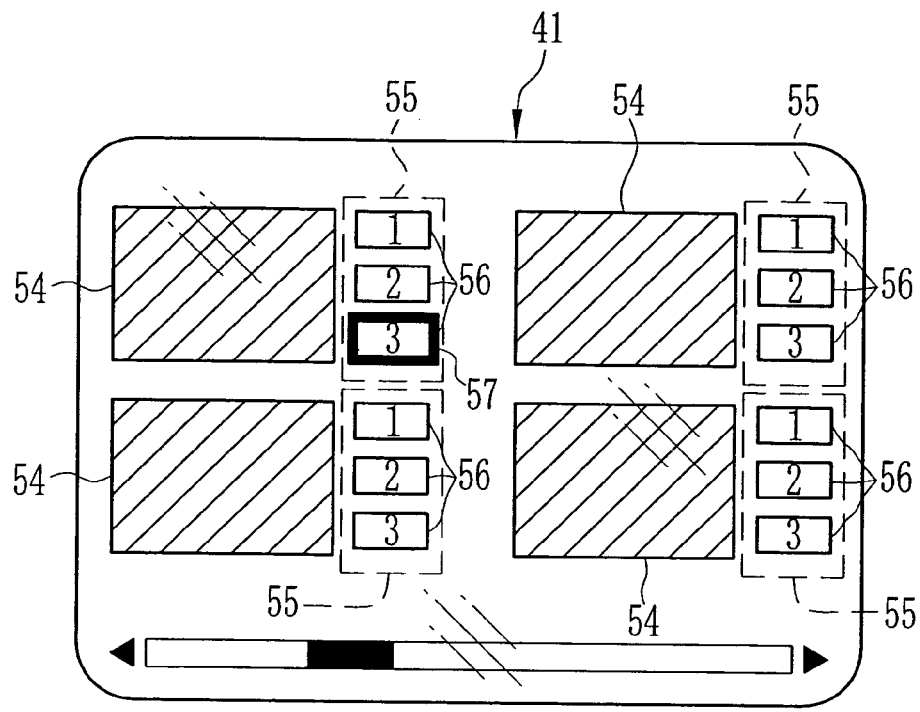
FIG. 2 is an explanatory view illustrating a print image selection screen.

FIG. 2 shows the print image selection screen displaying thumbnail images 54 stored in the first memory 53 and number bars 55 disposed next to each of the thumbnail images 54 for showing the number of prints of each thumbnail image 54. Each of the number bars 55 includes boxes 56 indicating the number of prints. One of the boxes 56 is framed by a cursor 57, which is shown as a thick frame in FIG. 2 and moves among the boxes 56 as the cursor key 43 is operated. When the determination button 45 is pushed, the number in the box 56 framed by the cursor 57 and the image 54, corresponding to the number bar 55 having the framed box 56, are stored in a second memory 59.

Figure 3:
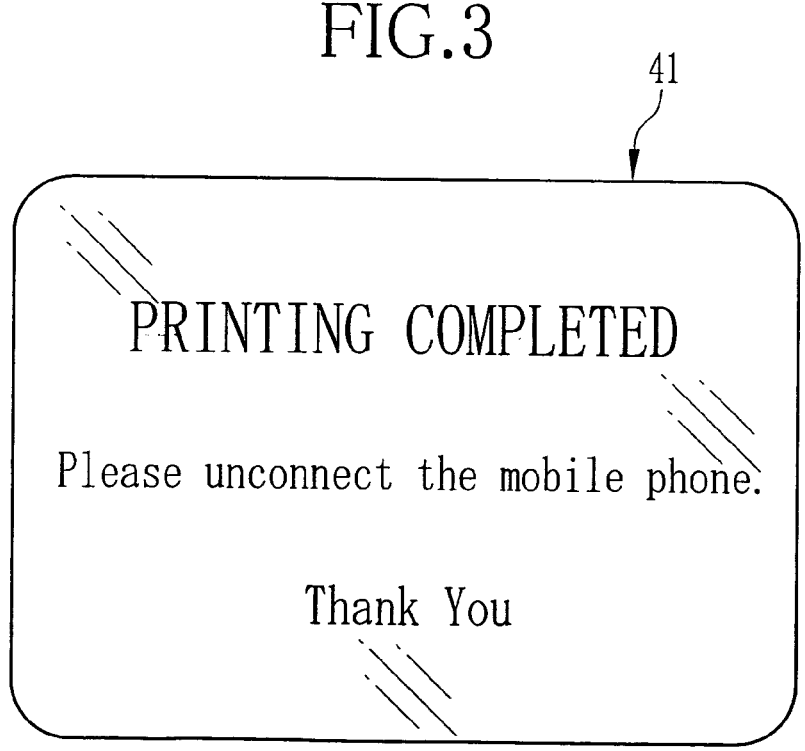
FIG. 3 is an explanatory view illustrating a screen informing completion of printing.

The print button 47 is operated to print the images stored in the second memory 59. When the print button 47 is operated, the controlling section 49 drives the printer 33 to start printing the images stored in the second memory 59. After the images stored in the second memory 59 are printed as many as each specified number of prints, also stored in the second memory 59, the controlling section 49 cuts off the communication with the charging server 26. At this point, the controlling section 49 displays a printing completion screen on the LCD 41 to inform that printing is completed, as shown in FIG. 3.

Figure 4:
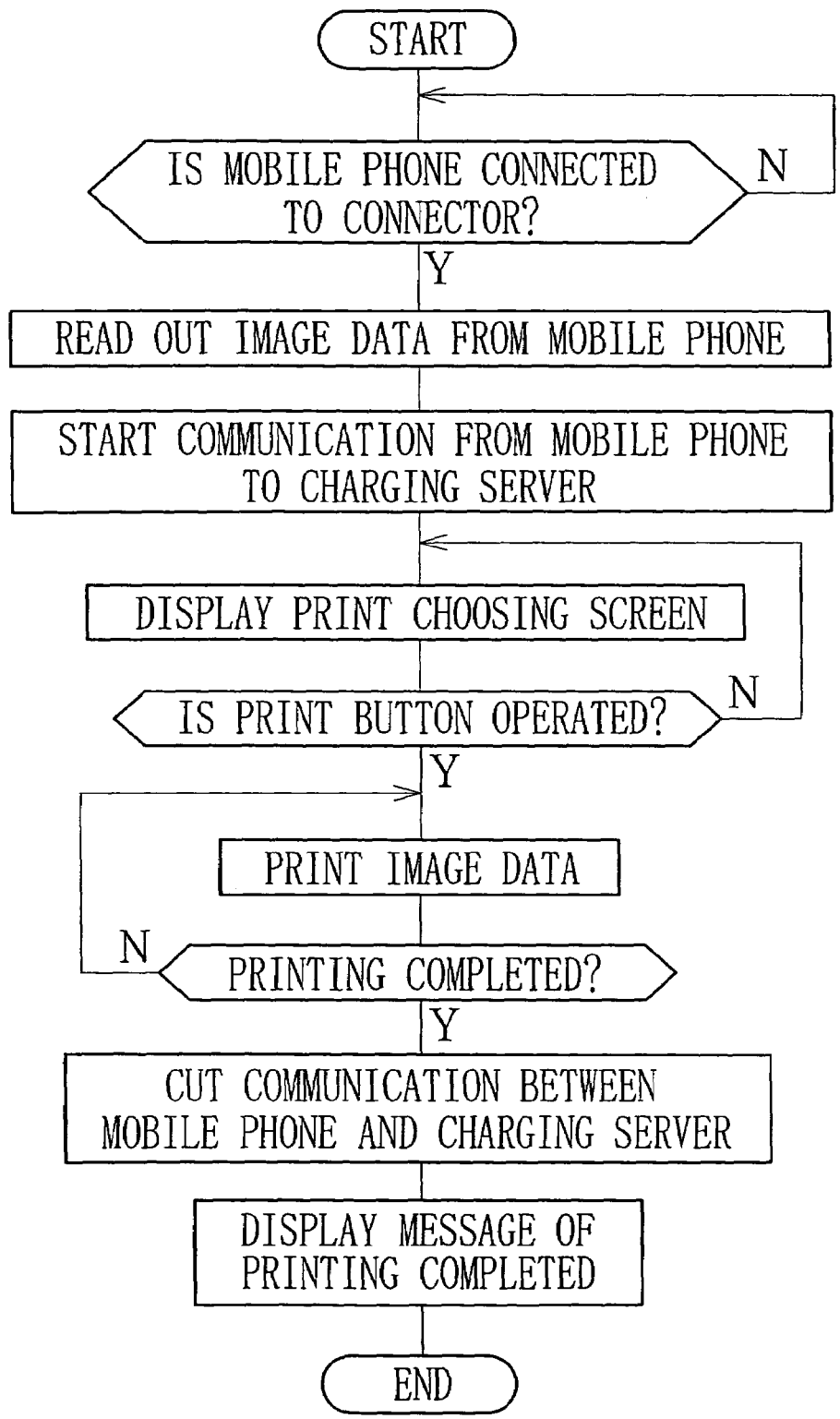
FIG. 4 is a flow chart showing a process of printing images.

An operation of the above embodiment of the present invention is explained now with using a flow chart shown in FIG. 4. In order to print the image data photographed by the mobile phone 10, a user needs to connect the communication terminal 25 of the mobile phone 10 to the connector 39 of the print unit 30. Thereby, the image data stored in the mobile phone 10 is read out by the adapter device 35.

Subsequently, the mobile phone 10 starts to communicate with the charging server 26, and the LCD 41 displays the print image selection screen. The user operates the cursor key 43 for shifting the cursor 57 and pushes the determination button 45 for determining images for printing and the number of prints of each image. Then, printing is started by pushing the print button 47. After the printing of the selected images as many as each specified number of prints is completed, the communication between the mobile phone 10 and the charging server 26 is cut off, and the printing completion screen shown in FIG. 3, informing that printing is completed, is displayed on the LCD 41.

Note that the present invention is not limited in the above embodiment in which the communication from the mobile phone 10 to the charging server 26 is started after the print unit 30 reads out the image data from the mobile phone 10, and is cut off after the printing is completed. For example, it is possible to arrange that the mobile phone 10 starts communication with the charging server 26 when printing is started or after the mobile phone 10 is connected to the connector 34. In addition, it is also possible to charge the telecommunication charge based on the number of prints of images after completing printing the images, though the telecommunication charge is based on the time from selecting the print images to completing printing the selected images, in the above embodiment.

Note that the type of communication from the mobile phone 10 to the charging server 26 may be either voice communication or data communication such as e-mail, for example. In case of that the telecommunication charge is charged by voice communication based on the number of prints, the mobile phone 10 calls the charging server 26 for the duration corresponding to the number of prints such that the telecommunication charge is charged as duration of call. In case of that the telecommunication charge is charged by data communication, data having a volume corresponding to the number of prints is sent to the charging server 26 by the mobile phone 10 such that the telecommunication charge is based on the volume of the data.

Note that it is also possible to arrange for the mobile phone 10 to send data of the number of prints to the charging server 26 such that the charging server 26 calculates the telecommunication charge based on the data of print number. Thereby, it may minimize the duration of the communication between the charging server 26 and the mobile phone 10.

Note that it is also possible for the user to select the print images within the mobile phone 10, though the user selects the images by the adapter device 35 in the above embodiment. In this case, for example, the user selects the print images within the mobile phone 10, and then sends the selected images from the mobile phone 10 to the adapter device 35 by connecting them each other. Then, the adapter device 35 starts communication from the mobile phone 10 to the charging server 26 and prints the selected images simultaneously. When printing is completed, the adapter device 35 cuts off the communication between the mobile phone 10 and the charging server 26. This is an efficient way, as only the images for printing are sent to the adapter 35.

Though the adapter device 35 controls the mobile phone 10 to communicate with the charging server 26 in the above embodiment, note that it is also possible to provide the adapter device 35 with a communication part 60 that is able to communicate with the charging server 26, as shown in FIG. 5. In this case, the adapter device 35 gains an ID data such as phone number, which is unique to the mobile phone 10, when the mobile phone 10 is connected to the connector 39. The adapter device 35 sends data of the number of prints and the ID data to the charging server 26 after printing is completed, such that the telecommunication charge is charged based on the data of the number of prints to the mobile phone 10. Otherwise, it is also possible that the user operates the mobile phone 10 to communicate with the charging server 26 and that printing is executed only when the communication between the mobile phone 10 and the charging server 26 is detected by the adapter device 35.

Note that, though the mobile phone with the camera is applied as the portable communication apparatus in the above embodiment, other portable communication apparatus such as PDA (Personal Digital Assistance), for example, may be also applied to the present invention.

Although the present invention has been described with respect to the preferred embodiments, the present invention is not to be limited to the above embodiments but, on the contrary, various modifications will be possible to those skilled in the art without departing from the scope of claims appended hereto.

What is claimed is:

1. An image print system comprising:
    a portable communication apparatus having a communicating device for communicating via telecommunication line, and an imaging device for photographing subjects and storing photographed images as image data;
    a charging server connected to said portable communication apparatus via said telecommunication line, for charging said portable communication apparatus for telecommunication charge based on communicating duration between said portable communication apparatus and a print unit and/or volume of communicated data between said portable communication apparatus and said print unit; and
    said print unit having a connecting device for connecting with said portable communication apparatus, for reading said image data into said print unit from said portable communication apparatus via said connecting device, for printing images on recording paper based on said image data, for connecting and disconnecting said charging server with said portable communication apparatus using said communication device, and for sending said communicating duration and/or said volume of communicated data to said charging server.

2. A print system defined in claim 1, wherein said print unit comprising:
    a print server for reading said image data into said print server from said portable communication apparatus by being connected with said portable communication apparatus and for controlling said portable communication apparatus to communicate/cut off the communication between said portable communication apparatus and said charging server; and
    a printer connected to said print server and controlled by said print server to print images based on said image data sent from said print server.

3. A print system defined in claim 2, wherein said print server comprising:
    a controlling section for reading and storing image data sent from said portable communication apparatus via said connecting device and for controlling said printer to print images selected by a user as many as the number of prints of said each selected image specified by the user;
    a display controlled by said controlling section to display images based on said image data stored in said controlling section; and
    an operating section connected to said controlling section such that the user may select images among said images displayed on said display and specify the number of prints of said each selected image.

4. A print system defined in claim 3, wherein said controlling section comprising:
    a ROM for storing a control program for controlling said print server, said printer, and said portable communication apparatus;
    a first memory for storing said image data read into said controlling section from said portable communication apparatus; and
    a second memory for storing said images and the number of prints of said each selected image specified by said operating section.

5. A print system defined in claim 1, wherein said print unit controls said portable communication apparatus to communicate with said charging server after reading said image data into said print unit from said portable communication apparatus and to cut off the communication with said charging server when printing of said images is completed.

6. A print system defined in claim 1, wherein said print unit controls said portable communication apparatus to communicate with said charging server when said print unit starts printing said images and to cut off the communication with said charging server when printing of said images is completed.

7. A print system defined in claim 1, wherein said print unit calculates communicating duration of said portable communication apparatus based on the number of prints of said images and controls said portable communication apparatus to communicate with said charging server for said calculated communicating duration.

8. A print system defined in claim 1, wherein said print unit calculates volume of communicated data based on the number of prints of said images and controls said portable communication apparatus to communicate with said charging server to send said calculated volume of communicated data.

9. A print system defined in claim 1, wherein said print unit creates data of the number of prints based on the number of prints of said images and controls said portable communication apparatus to communicate with said charging server to send said data of the number of prints,
    wherein said charging server calculates said volume of communicated data based on said data of the number of prints received from said portable communication apparatus.

10. An image print system comprising:
a portable communication apparatus having a communicating device for communicating via telecommunication line, an imaging device for photographing subjects and storing photographed images as image data, and ID data for identifying said portable communication apparatus;
a print unit having a communicating device for communicating via said telecommunication line and a connecting device for connecting with said portable communication apparatus, for reading said image data and said ID data into said print unit from said portable communication apparatus, for printing images on recording paper based on said image data, for creating data of the number of prints based on the number of prints of images, for connecting and disconnecting said charging server with said portable communication apparatus using said communication device of said portable communication apparatus, and for sending said ID data and said data of the number of prints; and
a charging server connected to said portable communication apparatus via said telecommunication line, for receiving said ID data and said data of the number of prints from said print unit, for calculating telecommunication charge based on said data of the number of prints, and for charging said portable communication apparatus identified by said ID data for said telecommunication charge.

11. An image print system comprising:
a portable communication apparatus having a communicating device for communicating via telecommunication line, and an imaging device for photographing subjects and storing photographed images as image data;
a charging server connected to said portable communication apparatus via said telecommunication line by operation of a user, for charging said portable communication apparatus for telecommunication charge based on communicating duration between said portable communication apparatus and a print unit and/or volume of communicated data between said portable communication apparatus and said print unit; and
said print unit connected to said portable communication apparatus, for connecting and disconnecting said charging server with said portable communication apparatus using said communication device, for sending said communicating duration and/or said volume of communicated data to said charging server, for reading said image data into said print unit from said portable communication apparatus, for detecting the communication between said portable communication apparatus and said charging server, and for printing images on recording paper based on said image data only when the communication between said portable communication apparatus and said charging server is detected.

12. A method for printing images photographed by a portable communication apparatus having an imaging device, comprising the steps of:
connecting said portable communication apparatus to said print server;
reading image data, stored in said portable communication apparatus, into a print server;
connecting said portable communication apparatus with a charging server via telecommunication line using a communication device on said portable communication apparatus by said print server;
displaying images on a display based on said image data read into said print server;
selecting images among said images displayed on said display, specifying the number of prints of said each selected image, and operating a print command, by a user;
driving a printer by said print server based on said print command, said selected images as many as said number of prints of said each selected image;
disconnecting said portable communication apparatus with said charging server via said telecommunication line using said communication device on said portable communication apparatus by said print server; and
charging said portable communication apparatus for telecommunication charge by said charging server based on communicating duration with said charging server.

13. A method for printing images photographed by a portable communication apparatus having an imaging device, comprising the steps of:
connecting said portable communication apparatus to said print server;
reading image data, stored in said portable communication apparatus, into a print server;
displaying images on a display based on said image data read into said print server;
selecting images among said images displayed on said display, specifying the number of prints of said each selected image, and operating a print command, by a user; driving a printer by said print server based on said print command, and connecting said portable communication apparatus with said charging server via telecommunication line using a communication device on said portable communication apparatus by said print server;
printing said selected images as many as the number of prints of said each selected image by said printer;
disconnecting said portable communication apparatus with said charging sever via telecommunication line using a communication device on said portable communication apparatus by said print server after printing said selected images as many as the number of prints of said each selected image by said printer; and
charging said portable communication apparatus for telecommunication charge by said charging server based on the communicating duration with said charging server.

14. A method for printing images photographed by a portable communication apparatus having an imaging device, comprising the steps of:
connecting said portable communication apparatus to said print server;
reading image data, stored in said portable communication apparatus, into a print server;
displaying images on a display based on said image data read into said print server;
selecting images among said images displayed on said display, specifying the number of prints of said each selected image, and operating a print command, by a user;
printing said selected images as many as said number of prints of said each selected image based on the print command;
calculating communicating duration between said portable communication apparatus and said print server by said print server based on the number of prints of said images;
connecting said portable communication apparatus with a charging server via telecommunication line using a communication device on said portable communication apparatus by said print server;

passing said calculated communicating duration to said charging server by said print server;

disconnecting said portable communication apparatus with said charging sever via telecommunication line using a communication device on said portable communication apparatus by said print server after passing said calculated communication duration; and charging said portable communication apparatus for telecommunication charge by said charging server based on said communicating duration with said charging sever.

15. A method for printing images photographed by a portable communication apparatus having an imaging device, comprising the steps of:

connecting said portable communication apparatus to said print server;

reading image data, stored in said portable communication apparatus, into a print server;

displaying images on a display based on said image data read into said print server;

selecting images among said images displayed on said display, specifying the number of prints of said each selected image, and operating a print command, by a user;

driving a printer by said print server based on the print command;

printing said selected images as many as said number of prints of said each selected image by said printer;

calculating volume of communicated data of said portable communication apparatus by said print server based on the number of prints of said images;

connecting said portable communication apparatus with a charging server via telecommunication line using a communication device on said portable communication apparatus by said print server;

sending a calculated volume of data to said charging server by said print server;

disconnecting said portable communication apparatus with said charging server via telecommunication line using a communication device on said portable communication apparatus by said print server after passing said calculated volume of data; and charging said portable communication apparatus for telecommunication charge based on said calculated volume of data received from said portable communication apparatus.

16. A method for printing images photographed by a portable communication apparatus having an imaging device, comprising the steps of:

connecting said portable communication apparatus to said print server;

reading image data, stored in said portable communication apparatus, into a print server;

displaying images on a display based on said image data read into said print server;

selecting images among said images displayed on said display, specifying the number of prints of said each selected image, and operating a print command, by a user;

driving a printer by said print server based on the print command;

printing said selected images as many as said number of prints of said each selected image by said printer;

creating a data of the number of prints of said images by said print server based on the number of prints of said images;

connecting said portable communication apparatus with a charging server via telecommunication line using a communication device on said portable communication apparatus by said print server;

sending said data of the number of prints to said charging server by said print server;

disconnecting said portable communication apparatus with said charging server via telecommunication line using a communication device on said portable communication apparatus by said print server after sending said data of the number of prints to said charging server;

calculating telecommunication charge by said charging server based on said data of the number of prints received from said portable communication apparatus, and charging said portable communication apparatus for the communication charge.

* * * * *